F. G. PFROMMER.
REPEATER FOR PHONOGRAPHS.
APPLICATION FILED SEPT. 22, 1916.
1,293,537.
Patented Feb. 4, 1919.
4 SHEETS—SHEET 1.
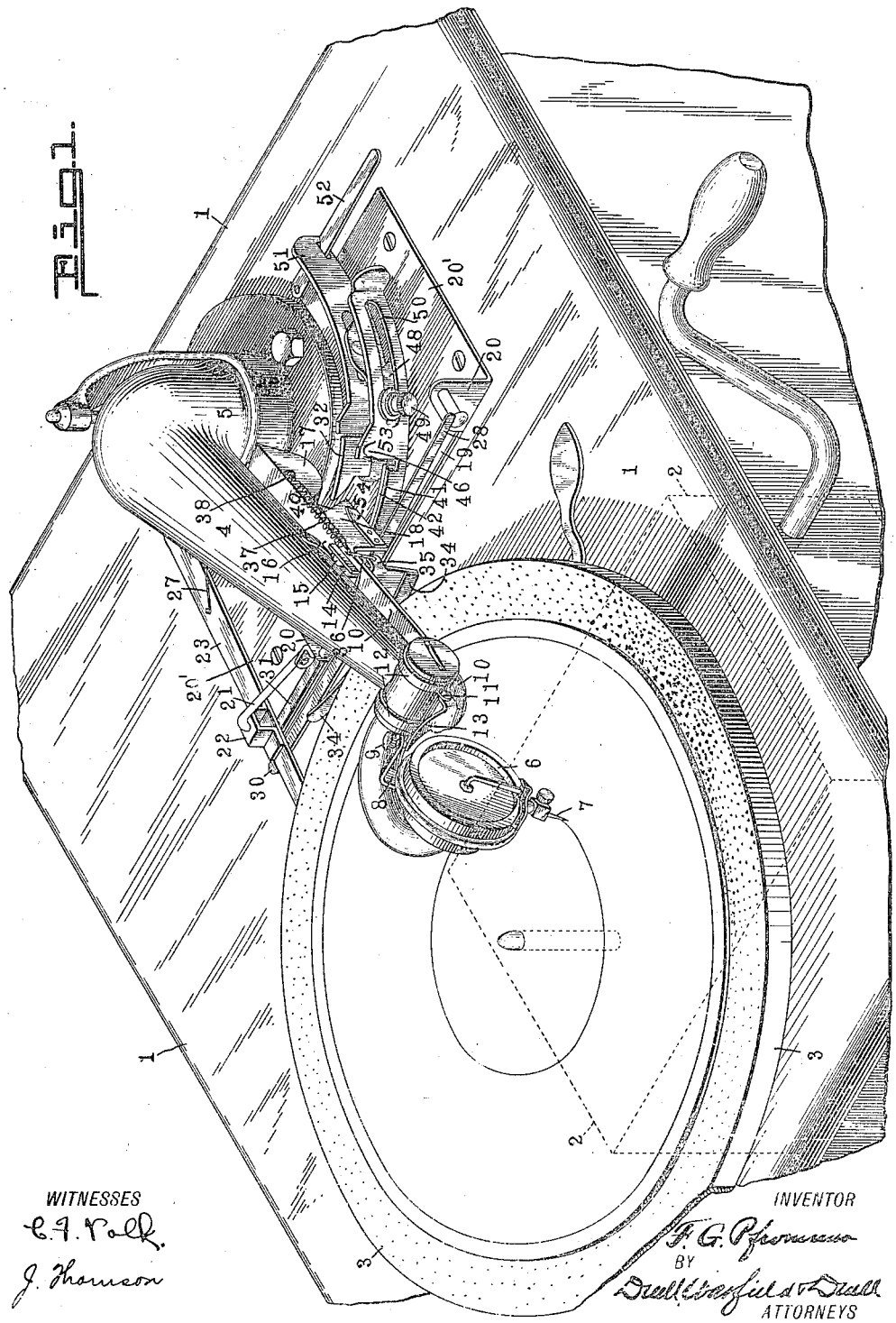
WITNESSES
INVENTOR
F. G. Pfrommer
BY
ATTORNEYS

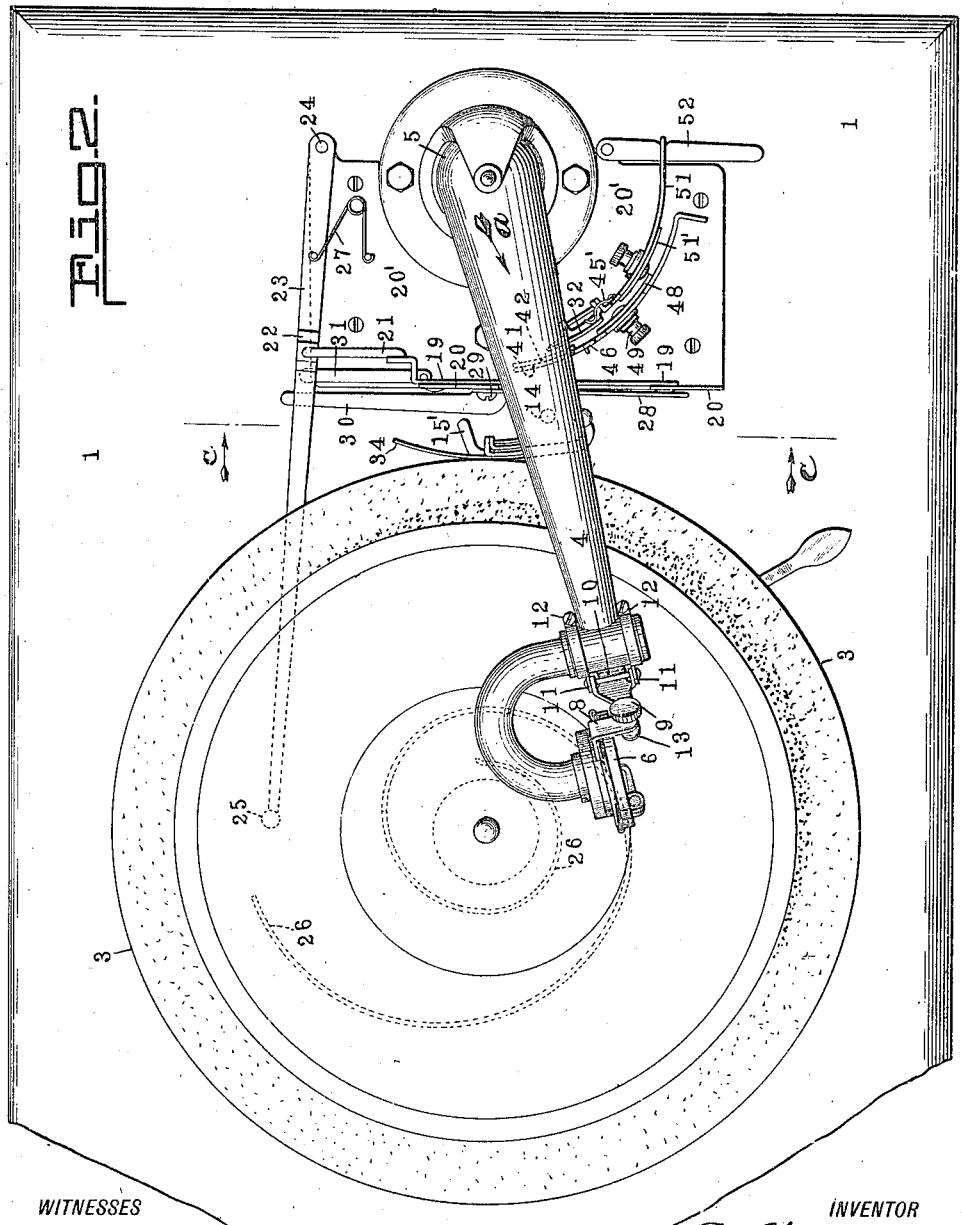

F. G. PFROMMER.
REPEATER FOR PHONOGRAPHS.
APPLICATION FILED SEPT. 22, 1916.
1,293,537.
Patented Feb. 4, 1919.
4 SHEETS—SHEET 3.
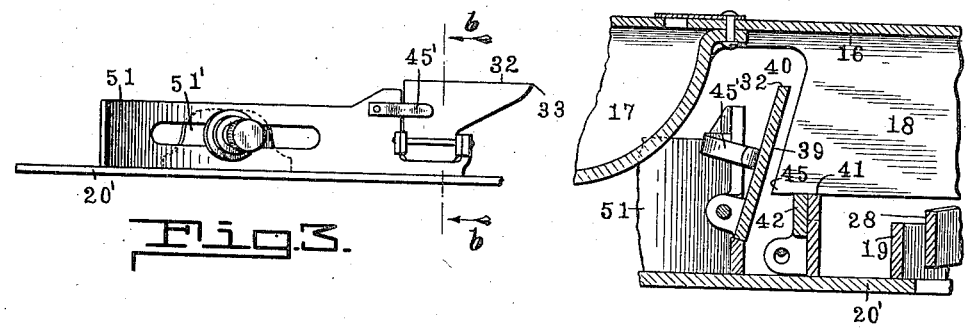
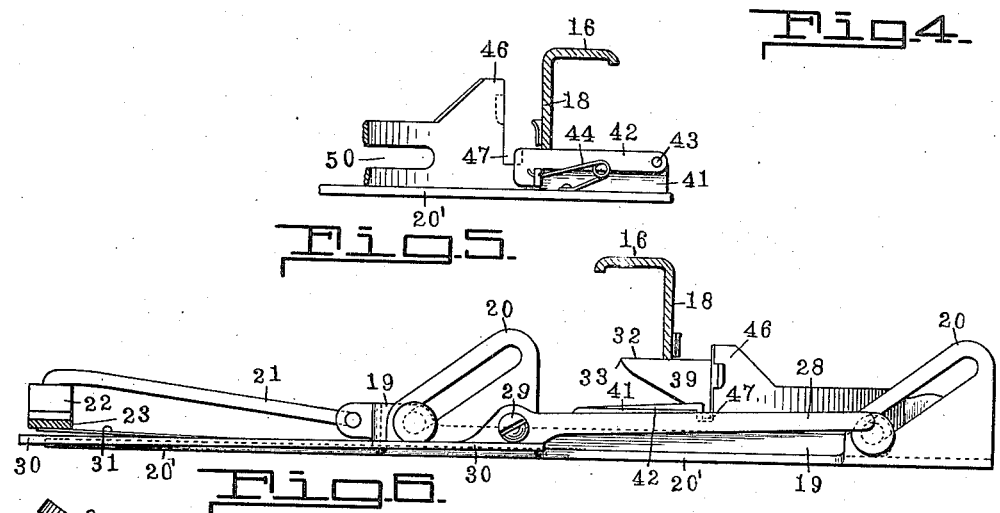
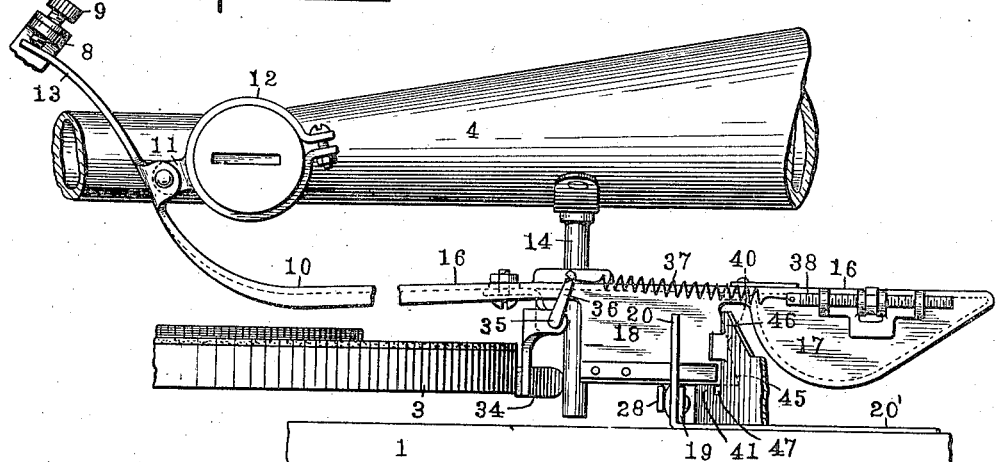
WITNESSES
INVENTOR
F. G. Pfrommer
BY
Dull, Warfield & Dull
ATTORNEYS

UNITED STATES PATENT OFFICE.

FREDERICK G. PFROMMER, OF YONKERS, NEW YORK.

REPEATER FOR PHONOGRAPHS.

1,293,537.  Specification of Letters Patent.  Patented Feb. 4, 1919.

Application filed September 22, 1916. Serial No. 121,528.

*To all whom it may concern:*

Be it known that I, FREDERICK G. PFROMMER, a citizen of the United States, residing at Yonkers, in the county of Westchester and State of New York, have invented certain new and useful Improvements in Repeaters for Phonographs, of which the following is a full, clear, and exact description, such as will enable others skilled in the art to which it appertains to make and use the same.

This invention relates to phonographs, and with respect to its more specific features, to repeating mechanism for phonographs.

One of the objects of the invention is the provision of an efficient construction whereby easy and smooth engagement and disengagement of the playing needle with the record is accomplished without marring either the record or the needle.

Another object of the invention is the provision of a practical construction of repeating mechanism which may be readily applied to standard forms of phonographs.

Another object of the invention is the provision of a repeating device which may be readily adjusted so as to operate in connection with different sized records.

Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

In the accompanying drawings forming part of this specification and wherein similar reference characters refer to similar parts throughout the several views,—

Figure 1 is a perspective view of a phonograph with the invention applied thereto;

Fig. 2 is a plan view of Fig. 1;

Fig. 3 is a view of the "record playing track" looking in the direction of the arrow *a*, Fig. 2;

Fig. 4 is a section on the line *b—b* of Fig. 3, showing also one of the levers;

Fig. 5 is a view of the "needle return track" and stop, looking in the same direction, as Fig. 3;

Fig. 6 is a section taken on the lines *c—c* of Fig. 2;

Fig. 7 is a side view of the tone arm and needle lifting lever; and

Figure 8:
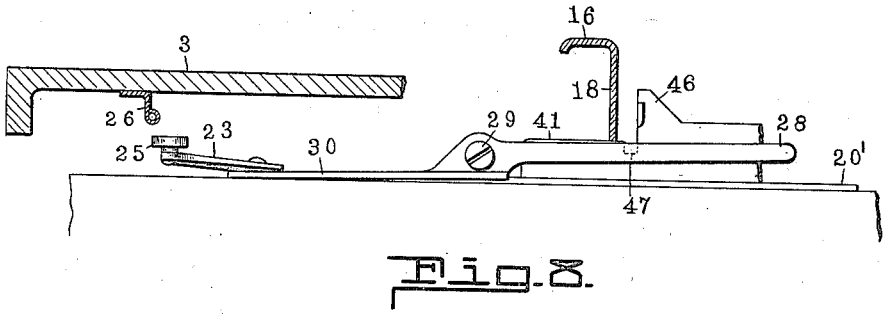
Figs. 8, 9 and 10 are diagrammatic sections showing detail relationships of several parts.
Figure 9:
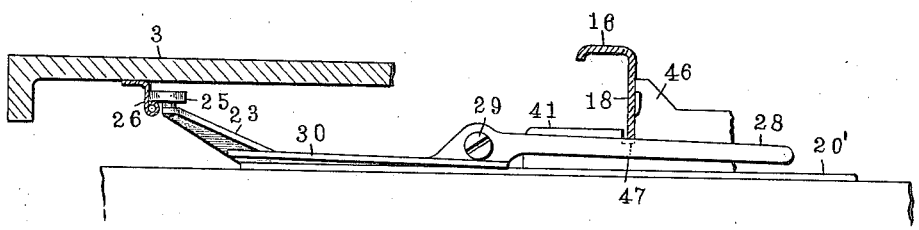
Figure 10:
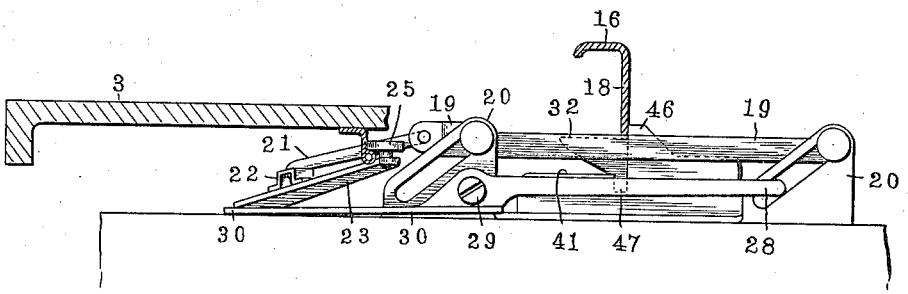

As the present invention has relation more particularly to a repeating mechanism for phonographs, it is disclosed herein in connection with an otherwise well-known form of phonograph. The numeral 1 indicates a base, below which may be supported a spring or other motor 2 adapted to drive a motor-operated part, which in the present instance is a record support, or rotatable table, 3; 4 indicating a tone arm pivoted to the base at 5 and overlying the record table, this tone arm being adapted to swing on its axis transversely of a record supported on said table. 6 indicates a sound box carrying the usual playing needle 7, the sound box comprising a bracket 8 having an adjustable abutment, such as a set screw 9, this abutment being adapted to coöperate with one end of a sound box lifting lever, hereinafter referred to. In the present embodiment the sound box is pivotally connected to the tone arm so as to move toward and from the record on the table 3. A record being placed on the table 3, as the motor operates the playing needle 7 traverses the record and the score is reproduced in the usual manner. In the present instance the needle traverses the record from its outer side toward the center of rotation thereof, and provision is made for automaticaly disengaging the needle from the record at the completion of the reproduction, returning the needle to a preceding portion of the record, (in the present instance the beginning thereof), and causing it to reëngage the record at said preceding portion, and in this wise the playing of the record will be repeated so long as the motor operates.

Means are employed to lift the needle out of engagement with the record and to support the needle out of engagement with the record while it is being returned to the beginning thereof, and in the present instance this means comprises a lever 10 pivotally connected with the tone arm 4, as by means of the ears 11 connected to straps 12, which may be attached to and detached from the tone arm. One arm of this lever, as 13, is adapted to engage the abutment or screw 9, so that when this arm rises the sound box will be lifted sufficiently to effect disengagement of the playing needle from the record. As will be obvious, this disengagement need be only slight. The arm 13 then supports the sound box and the needle while the latter is being returned to a preceding portion of the record, whereupon a downward movement of the arm 13 permits the needle to reengage the record. After such reëngagement has been effected, the arm 13 moves downwardly farther sufficiently to become disengaged or free of the sound box so as to permit the needle to have unobstructed play upon the record, this lost motion being desirable on account of inequalities in the rotary plane occupied by the record during operation. It is most desirable that the needle shall be brought into reëngagement with the record lightly and smoothly, so as to avoid marring the record or the needle. Especially is this desirable when needles are employed which are designed to be played several times, as for instance, tungsten needles. As will appear, the smooth and easy reëngagement conducing to the longevity of needles and the records is effected by the present invention.

The lever 10 preferably lies beneath the tone arm 4 and may be guided for its vertical movement toward and from the record by the stop post 14 passing through a slot 15 in the lever, this stop post being adapted to coöperate with the usual adjustable member 15' adapted to coöperate with a manually operated brake to stop the rotation of the record table when the playing of the record has been completed. It will be observed that the adjustable functions of this brake mechanism are not interfered with by this invention, but that on the contrary the construction is such as to permit the automatic stopping of the playing of the record or not, as may be desired. The needle-lifting movement of the lever 10 is effected by means of a motor, and this motor, in the present instance, is provided by the arm 16 of the lever 10, this arm either being sufficiently long so as to have an effective weight sufficient to overcome the weight of the sound box and needle, or, as in the present embodiment, the arm may be weighted at its outer end, as at 17, so that when the lever 10 is free to move the weight causes the arm 13 to rise. The weight may be provided by a series of shot held in a receptacle at the end of the arm 16, as illustrated. In this wise the effective weight of the arm 16 may be adjusted by using more or less shot. The numeral 18 indicates a dog, the same being a part of the weight arm 16, and depending therefrom, and 19 indicates a motor-operated means or lever lifter disposed below and opposite the dog 18 and adapted to lift the arm 16 of the lever 10, so as to cause the arm 13 to lower and permit the needle to engage the record. The member or lever lifter 19 comprises a bar guided in inclined slots in upright brackets 20 fastened to the base 1, or forming part of a plate 20' screwed to said base, said bar being pivotally connected to one end of a connecting rod 21, the other end of said rod loosely pivotally engaging a strap 22 fastened to a lever 23, one end of which is pivoted to the plate 20' at 24, the other end having a projection, or cam follower, 25 adapted to engage a cam 26 rotatable with the record support and which is preferably a spiral cam formed on the under face of the table 3, and having a groove engaged by the edges of roller 25. As the table 3 rotates the projection 25 when engaged by the cam will move the follower 23 in a direction to raise the bar 19 and thus elevate the weight arm 16. After the full upward movement of the bar 19 has been effected, the projection 25 will be disengaged from the cam 26, whereupon the spring 27 will return the follower more or less toward its initial position ready for the next inward movement. The raising and lowering of the follower into engagement with the cam 26 is effected by the lever 10, the weight arm 16 of which, on its descent, engages a follower lifter 28, in the present instance an arm of a lever pivoted to the base at 29 and having another arm 30 lying beneath the follower 23. The arm 28 is disposed so as to be engaged by the lower edge of the dog 18 before the full downward movement of the weight arm 16 is effected, so that the full downward movement of the dog will raise the lever 23 vertically and cause the roller 25 to come into the path of the cam 26. A spring 31 may be employed to cushion the downward movement of the follower lever 23.

When the needle 7 is brought into engagement with the record at the beginning of the record the weight arm 16 is in its elevated position with the arm 13 slightly out of engagement with the screw 9. To support the arm 16 in this position during the playing of the record a track 32 is engaged by the dog 18 of the weight arm during the progress of the needle transversely of the record, the dog 18 slipping off the end 33 of the track when the playing of the record has been completed. The dropping of the dog from the track 32 effects the disengagement of the needle from the record through the instrumentality of the arm 13 and sound box, and as well the engagement of a shoe 34 with the record support 3, this shoe being designed to coöperate frictionally with the edge of the record table to return the needle for the repetition of the record. In the present embodiment the shoe 34 is pivotally connected at 35 to the weight arm 16, this shoe depending from the weight arm and having a crank arm 36 to which is connected one end of a spring 37, the other end of said spring being connected to an adjusting screw 38 for adjusting the tension of this spring. The shoe 34 is so pivoted relative to the pivot of the lever 10 that when the weight arm 16 is in its elevated position, the shoe escapes the edge of the record table 3, permitting the latter to rotate freely, unobstructed by said shoe. The stress of spring 37 when the weight 17 is up may cause the upper edge of the shoe 34 to contact with the arm 16 and thereby prevent contact of said shoe with the record table 3 during playing of the record. When the weight arm 16 drops, however, the shoe comes into contact with the edge of the record table 3 and the friction between the rotating table and the shoe operates to swing the tone arm so as to return the needle transversely of the record to the beginning of the latter. Any suitable material may be employed for the shoe, that in the present embodiment being constructed as a curved metallic plate faced with leather and having sufficient lateral extent to coöperate with the edge of the table 3 for the full movement of the needle from its inner to its outer position.

When the weight arm of the lever 16 drops from the track 32 and the needle is raised from the record the frictional engagement between the shoe 34 and the record table moves the lever 10 across the record in a direction to cause the needle 7 to assume position opposite the beginning of the record. In this movement the dog 18 passes by the front face 39 of the track 32, the dog being cut away at 40 so as to escape contact with said face on said return movement. Preferably on this return movement the lower edge of the dog 18 slides on a lower track or guide 41 and on the edge of a keeper 42 pivoted to the lower track, at 43, said keeper being yieldingly held upward by a light spring 44. When the dog 18 has moved across the guide 41 into position such that the needle will be presented opposite the beginning of the record the lifter 19 rises and lifts the weight arm and the dog 18 therewith so as to lower the sound box and place the needle gently upon the record, the end 45 of the dog 18 wiping against the face 39 of the track 32 and deflecting it rearwardly as the dog rises. When the dog has risen sufficiently the spring 45' urges the track 32 transversely into the vertical path of the dog 18, which latter will then rest upon the track 32 and the weight arm be maintained lifted during the succeeding playing operation. A device to limit the extent of the return movement of the needle is provided, which preferably comprises a stop 46 in the return path of the dog 18, said stop being provided by an upwardly extending portion of the guide member 41. Preferably also this guide is notched or recessed, as at 47, for the reception of the dog 18 when it leaves the track 41, this recess preventing rebound of the weight arm from initial playing position, the keeper 42 assisting to retain the dog effectively against the stop 46 during the rise of the weight arm. The stop 46 is adjustable longitudinally of the path of translation of the weight arm 16 so as to limit the return movement of said weight arm. Such adjustment is accomplished by forming the track 41 and the stop 46 in one piece, which may be adjustably connected to a member 48 fixed to the base 1, the adjustment being effected by a set screw 49 passing through a slot 50 in said plate and engaging said member 48. A similar adjustment may be provided for the track 32 so as to permit the end 33 thereof to be adjusted to a point at which the needle is lifted from the record. Preferably the track 32 is pivotally connected with a plate 51 adjustably connected to a member 51', fixed to the base and operated by a hand lever 52, also fixed to said base. As the lever arm 16 rises, a forwardly projecting guide 53 on the stop 46 engages the inside face of a projection 54 on the dog 18, so as to retain the lever arm 16 in position to hold the needle 7 at the beginning of the record, until the dog 18 engages the upper edge of track 32.

In operation, when the end of the record is reached the weight arm 16 will drop from the point 33, lift the needle from the record, and move the shoe 34 into contact with the edge of the record table. The continued rotation of the record table will frictionally coöperate with said shoe to give the needle a return movement, the lever 10 moving with the tone arm until brought up by the dog 18 coming into contact with the stop 46. At this point the weight arm will drop into the notch 47 and move the follower lifter arm 28 downwardly, thus raising the follower 25 into the path of the cam 26, and also, by engaging the upper edge of link 19, returning the follower to initial position. The follower will then be moved inwardly and cause the lifter 19 to elevate the weight arm and effect reëngagement between the needle and the record. The track 32 is disposed at such a height and the lifter 19 has such range of movement that after the needle has reëngaged the record, sufficient further upward movement of the weight arm 16 is effected to free the arm 13 from the end of the screw 9 so that thereafter, in the playing of the record, the needle is unobstructed.

Thus by the above described invention are accomplished, among others, the objects hereinbefore referred to.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described, and all statements of the scope of the invention, which, as a matter of language, might be said to fall therebetween.

Having described my invention, what I claim as new and desire to secure by Letters Patent is:

1. In a phonograph or the like, in combination, a playing needle adapted to traverse the record, means adapted to disengage the needle from the record, return it to a preceding portion of the record and cause it to reëngage the record comprising a lever weighted to lift the needle from the record, and means to support said weight to permit said needle to play.

2. In a phonograph or the like, in combination, a playing needle adapted to traverse the record, means adapted to disengage the needle from the record, return it to a preceding portion of the record and cause it to reëngage the record comprising a lever weighted to lift the needle from the record, and means to support said weight to permit said needle to play, said lever being arranged to have lost motion before coöperating with the sound box to lift the needle.

3. In a phonograph or the like, in combination, a playing needle adapted to traverse the record, means adapted to disengage the needle from the record, return it to a preceding portion of the record and cause it to reëngage the record comprising a lever weighted to lift the needle from the record, and means gradually to raise said weight to bring the needle into engagement with the disk.

4. In a phonograph or the like, in combination, a playing needle adapted to traverse the record, means adapted to disengage the needle from the record, return it to a preceding portion of the record, and cause it to reëngage the record, comprising a motor-operated lever adapted to coöperate with the sound box to support the needle out of engagement with the record, motor-operated means adapted to move said lever to cause the needle to engage the record and thereafter become disengaged from the sound box comprising a cam rotatable with the record support, and a lever lifter opposite said lever operated by said cam.

5. In a phonograph or the like, in combination, a playing needle adapted to traverse the record, means adapted to disengage the needle from the record, return it to a preceding portion of the record, and cause it to reëngage the record, comprising a motor-operated lever adapted to coöperate with the sound box to support the needle out of engagement with the record, motor-operated means adapted to move said lever to cause the needle to engage the record and thereafter become disengaged from the sound box, comprising a cam rotatable with the record support, a follower movable into and out of engagement with said cam, and means operated by said lever adapted to move said follower into engagement with said cam.

6. In a phonograph or the like, in combination, a playing needle adapted to traverse the record, means adapted to disengage the needle from the record, return it to a preceding portion of the record and cause it to reëngage the record, comprising a motor-operated part, and a shoe adapted to frictionally engage said motor-operated part to effect said return.

7. In a phonograph or the like, in combination, a playing needle adapted to traverse the record, means adapted to disengage the needle from the record, return it to a preceding portion of the record and cause it to reëngage the record, comprising a motor-operated part, and a shoe connected to the tone arm adapted to frictionally engage said motor-operated part to effect said return.

8. In a phonograph or the like, in combination, a playing needle adapted to traverse the record, and means adapted to disengage the needle from the record, return it to a preceding portion of the record and cause it to reëngage the record, comprising a shoe connected to the tone arm and adapted to engage the record support to effect said return.

9. In a phonograph or the like, in combination, a playing needle adapted to traverse the record, means adapted to disengage the needle from the record, return it to a preceding portion of the record and cause it to reëngage the record, comprising a motor-operated part, a shoe adapted to frictionally engage said motor-operated part to effect said return, a motor-operated lever adapted to lift said needle from the record and support it during its return, motor-operated means adapted to move said lever to cause said needle to reëngage said record after its return, means adapted to adjust the point at which the needle is lifted from the record, and means adapted to adjust the extent of said return movement.

10. In a repeater for phonographs, in combination, a sound box movable toward and from the record, a needle, a lever against one arm of which said sound box is adapted to be supported, the other arm of said lever being of an effective weight to overcome the weight of said sound box and needle, and motor-operated means adapted to raise said last-mentioned arm to permit said needle to move into engagement with a record.

11. In a repeater for phonographs, in combination, a rotatable record table, a movable tone arm, a needle carried by said arm, and means adapted to move said tone arm transversely of a record on said table comprising a shoe connected to said tone arm and adapted to move into and out of contact with said table.

12. In a repeater for phonographs, in combination, a rotatable record table, a tone arm, a sound box movable toward and from a record on said table, a needle, a translatable lever against one arm of which said sound box is adapted to be supported, the other arm of said lever being of an effective weight to overcome the weight of said sound box and needle, a shoe connected to said tone arm adapted to move into and out of contact with said table, whereby returning movement of said needle transversely of a record on said table is effected, and motor-operated means adapted to raise said weight arm to permit the needle to move into engagement with the record.

13. In a repeater for phonographs, in combination, a sound box movable toward and from the record, a needle, a lever against one arm of which said sound box is adapted to be supported, the other arm of said lever being of an effective weight to overcome the weight of said sound box and needle, and motor-operated means adapted to raise said last-mentioned arm to permit said needle to move into engagement with a record and cause said first-mentioned arm to be free of the sound box when the needle is on the record.

14. In a repeater for phonographs, in combination, a rotatable record table, a tone arm, a sound box movable toward and from a record on said table, a needle, a translatable lever against one arm of which said sound box is adapted to be supported, the other arm of said lever being of an effective weight to overcome the weight of said sound box and needle, a shoe connected to said tone arm adapted to move into and out of contact with said table, whereby returning movement of said needle transversely of a record on said table is effected, and motor-operated means adapted to raise said weight arm to permit the needle to move into engagement with the record, said motor-operated means comprising a rotatable cam, a reciprocatory follower operated by said cam and a member connected to said follower for lifting said weight arm.

15. In a repeater for phonographs, in combination, a rotatable record table, a tone arm, a sound box movable toward and from a record on said table, a needle, a translatable lever against one arm of which said sound box is adapted to be supported, the other arm of said lever being of an effective weight to overcome the weight of said sound box and needle, a shoe connected to said tone arm adapted to move into and out of contact with said table, whereby returning movement of said needle transversely of a record on said table is effected, and motor-operated means adapted to raise said weight arm to permit the needle to move into engagement with the record, said motor-operated means comprising a cam on the under face of said table, a reciprocatory follower vertically movable to engage and disengage said cam, a weight arm lifter operated by said follower, and a follower lifter adapted to be raised by the descent of said weight arm to effect engagement between said cam and said follower lifter.

16. In a repeater for phonographs, in combination, a rotatable record table, a tone arm, a sound box movable toward and from a record on said table, a needle, a translatable lever against one arm of which said sound box is adapted to be supported, the other arm of said lever being of an effective weight to overcome the weight of said sound box and needle, a shoe connected to said tone arm adapted to move into and out of contact with said table, whereby returning movement of said needle transversely of a record on said table is effected, and motor-operated means adapted to raise said weight arm to permit the needle to move into engagement with the record, said motor-operated means comprising a cam on the under face of said table, a reciprocatory follower vertically movable to engage and disengage said cam, and a pivoted lever one arm of which is beneath said reciprocatory follower and the other in the descending path of said weight arm adapted to lift said reciprocatory follower into the path of said cam.

17. In a repeater for phonographs, in combination, a rotatable record table, a tone arm, a sound box movable toward and from a record on said table, a needle, a translatable lever against one arm of which said sound box is adapted to be supported, the other arm of said lever being of an effective weight to overcome the weight of said sound box and needle, a shoe connected to said tone arm adapted to move into and out of contact with said table, whereby returning movement of said needle transversely of a record on said table is effected, motor-operated means adapted to raise said weight arm to permit the needle to move into engagement with the record, and means adapted to maintain said weight arm elevated during playing of the record.

18. In a repeater for phonographs, in combination, a rotatable record table, a tone arm, a sound box movable toward and from a record on said table, a needle, a translatable lever against one arm of which said sound box is adapted to be supported, the other arm of said lever being of an effective weight to overcome the weight of said sound box and needle, a shoe connected to said tone arm adapted to move into and out of contact with said table, whereby returning movement of said needle transversely of a record on said table is effected, motor-operated means adapted to raise said weight arm to permit the needle to move into engagement with the record, and means adapted to maintain said weight arm elevated during playing of the record, comprising a track longitudinally of which said weight arm moves, and a dog carried by said weight arm adapted to move on said track.

19. In a repeater for phonographs, in combination, a rotatable record table, a tone arm, a sound box movable toward and from a record on said table, a needle, a translatable lever against one arm of which said sound box is adapted to be supported, the other arm of said lever being of an effective weight to overcome the weight of said sound box and needle, a shoe connected to said tone arm adapted to move into and out of contact with said table, whereby returning movement of said needle transversely of a record on said table is effected, and motor-operated means adapted to raise said weight arm to permit the needle to move into engagement with the record, comprising a track pivoted for transverse movement, a dog carried by said weight arm adapted to slide longitudinally of said track, said dog being disposed so that upon the weight arm being lifted the dog wipes past said track, and a spring adapted to urge said track transversely into the vertical path of said dog.

20. In a repeater for phonographs, in combination, a rotatable record table, a tone arm, a sound box movable toward and from a record on said table, a needle, a translatable lever against one arm of which said sound box is adapted to be supported, the other arm of said lever being of an effective weight to overcome the weight of said sound box and needle, a shoe connected to said tone arm adapted to move into and out of contact with said table, whereby returning movement of said needle transversely of a record on said table is effected, a stop adjustable longitudinally of the path of translation of said lever adapted to coöperate with said lever to limit its translation in one direction, and motor-operated means adapted to raise said weight arm to permit the needle to move into engagement with the record.

In testimony whereof I affix my signature, in the presence of two witnesses.

FREDERICK G. PFROMMER.

Witnesses:
H. M. SEAMANS,
J. THOMSON.

Copies of this patent may be obtained for five cents each, by addressing the "Commissioner of Patents, Washington, D. C."